United States Patent
Hofmann (10) Patent No.: US 10,770,999 B2
(45) Date of Patent: Sep. 8, 2020

(54) BRUSHLESS, SELF-EXCITED SYNCHRONOUS FIELD-WINDING MACHINE

(71) Applicant: THE REGENTS OF THE UNIVERSITY OF MICHIGAN, Ann Arbor, MI (US)

(72) Inventor: Heath F. Hofmann, Ann Arbor, MI (US)

(73) Assignee: THE REGENTS OF THE UNIVERSITY OF MICHIGAN, Ann Arbor, MI (US)

(*) Notice: Subject to any disclaimer, the term of this patent is extended or adjusted under 35 U.S.C. 154(b) by 0 days.

(21) Appl. No.: 16/385,556

(22) Filed: Apr. 16, 2019

(65) Prior Publication Data

US 2019/0319567 A1    Oct. 17, 2019

Related U.S. Application Data

(60) Provisional application No. 62/658,850, filed on Apr. 17, 2018.

(51) Int. Cl.
  *H02P 21/00* (2016.01)
  *H02P 21/30* (2016.01)
  *H02P 21/22* (2016.01)

(52) U.S. Cl.
  CPC .............. *H02P 21/30* (2016.02); *H02P 21/22* (2016.02)

(58) Field of Classification Search
  CPC ......... H02K 19/12; H02K 19/26; H02P 25/03
  See application file for complete search history.

(56) References Cited

U.S. PATENT DOCUMENTS

| 6,051,953 A | 4/2000 | Vithayathil |
| 9,813,004 B2 | 11/2017 | Shrestha et al. |
| 2015/0194855 A1* | 7/2015 | Kubo ............... H02K 3/527 |
| | | 310/68 D |

FOREIGN PATENT DOCUMENTS

| JP | 2013-013246 A | 1/2013 |
| JP | 2014-007788 A | 1/2014 |
| JP | 2014-007837 A | 1/2014 |

OTHER PUBLICATIONS

"Design and Analysis of a Novel Brushless Wound Rotor Synchronous Machine" Q. Ali, et al, IEEE Transactions on Magnetics, vol. 51, No. 11, (Nov. 2015).

* cited by examiner

*Primary Examiner* — Karen Masih
(74) *Attorney, Agent, or Firm* — Harness, Dickey & Pierce, P.L.C.

(57) ABSTRACT

A brushless, self-excited synchronous field winding machine is presented. The AC stator is configured with four or more phases to produce independent magnetic fields at different spatial harmonics. Windings in the rotor are configured to magnetically couple to the different spatial harmonics produced by the AC stator. More specifically, an oscillating field generated by the stator magnetically couples to the excitation winding on the rotor. This induces an AC voltage which results in current flowing through the field winding of the rotor. The magnitude of the field current is therefore controlled by the magnitude of the oscillating field. The AC stator also produces a magnetic field at a different spatial harmonic which magnetically couples to field winding of the rotor. This component will interact with the field current to produce torque. With this approach, the power density of the electric machine is significantly increased as compared to conventional field winding designs.

17 Claims, 5 Drawing Sheets

BRUSHLESS, SELF-EXCITED SYNCHRONOUS FIELD-WINDING MACHINE

CROSS-REFERENCE TO RELATED APPLICATIONS

This application claims the benefit of U.S. Provisional Application No. 62/658,850, filed on Apr. 17, 2018. The entire disclosure of the above application is incorporated herein by reference.

FIELD

The present disclosure relates to synchronous field-winding electric machines.

BACKGROUND

Electric machines used in variable speed drive applications such as the propulsion of hybrid electric vehicles should possess low cost and high power density. There are four electric machine topologies typically used in variable speed drives: induction, reluctance, permanent magnet (PM), and synchronous field winding. These fundamental topologies can be combined. A key example is the interior permanent magnet (IPM) machine, which combines the reluctance and permanent magnet topologies.

Permanent magnet and field-winding machines differ from induction and reluctance machines in that the rotor of the machine has an independent magnetic excitation. This allows these topologies to have higher torque densities. For example, under certain simplifying assumptions (e.g., linear magnetic behavior) it can be shown that a synchronous field-winding machine can produce 30% higher torque than an induction machine for a given amount of I2R losses in the stator and rotor. Conversely, for a given torque, the field winding machine generates 30% less conduction losses than an induction machine.

Permanent magnet and field winding machines are also both capable of achieving unity power factor, unlike induction and reluctance machines where a maximum power factor of 0.8 is common. In variable-speed drive (VSD) applications, unity power factor means that the VSD can provide its peak power capability (based upon its voltage and current constraints) to the machine. For a given power rating of the machine, this results in a reduced cost of the VSD, as transistors with lower current and/or voltage ratings can be used.

Finally, the independent excitation of synchronous field winding and certain permanent magnet machine designs allows these machines to achieve Constant Power over a Wide Speed Range (CPWSR). As a result of the existing machine topologies, permanent magnet and field-winding machines stand out as the most desirable.

Permanent magnet machines with rare earth magnets have been the topology of choice in high-performance applications, as the magnets generate magnetic fields without the conduction losses of field windings. However, the cost of rare earth materials has experienced high volatility, spurring interest in the development of alternative technologies.

The operation of synchronous field winding machines is similar to that of permanent magnet machines, except that electromagnets instead of permanent magnets exist on the rotor. As the main materials in field winding machines are iron and copper, they are relatively inexpensive.

Conventionally, the field winding currents of synchronous field-winding machines enter the rotor through the use of slip rings. However, this approach is undesirable due to the need for a rotating mechanical contact that is subject to wear, the need for an auxiliary circuit to generate and regulate the field-winding current, and the extra space, mass, and cost associated with both the slip ring and auxiliary circuit. Rotary transformers or brushless exciters have also been used to transmit the electrical power consumed by the electromagnets. This, however, requires such a transformer as well as a power electronic circuit that transfers power to the rotor, thereby also negatively affecting cost, mass, and space.

This section provides background information related to the present disclosure which is not necessarily prior art.

SUMMARY

This section provides a general summary of the disclosure, and is not a comprehensive disclosure of its full scope or all of its features.

A synchronous field-winding electric machine is presented. The electric machine includes a rotor and an AC stator arranged adjacent to and interoperable with the rotor. In one embodiment, the AC stator is configured with four or more phases to produce independent magnetic fields at two or more spatial harmonics. The rotor includes an excitation winding and a field winding. The field winding is electrically coupled to the excitation winding. The excitation winding and the field winding are configured to magnetically couple to the two or more spatial harmonics of the AC drive signal, such that the excitation winding is independently excitable from the field winding by different spatial harmonics of the AC drive signal. For example, the excitation winding is configured to magnetically couple to a given spatial harmonic of the two or more spatial harmonics of the AC drive signal while the field winding is configured to magnetically couple to another harmonic of the two or more spatial harmonics of the AC drive signal, such that the given harmonic differs from the another harmonic. A controller is electrically coupled to windings of the AC stator and independently controls the magnetic fields at the two or more spatial harmonics.

During operation, the torque of the electric machine is determined as a function of current in the field winding and current in the stator that produces the spatial harmonic which magnetically couples to the field winding.

In one embodiment, the AC stator is configured with five windings and the excitation winding is further defined as a three phase winding. The field winding may be electrically coupled by a rectifier circuit to the excitation winding, and the controller may be electrically coupled via an inverter circuit to the windings of the AC stator.

In some embodiments, the excitation winding is configured to magnetically couple to a given harmonic of the magnetic fields produced by the AC stator and the field winding is configured to magnetically couple to another harmonic which is three times the given harmonic.

In another aspect, the controller is configured to receive measurements of current in windings of the stator and convert the current measurements to d-q currents using a direct-quadrature-zero transformation. The controller in turn calculate an difference between the d-q currents and a set of reference currents, converts the differences to voltages and generate command voltages for the AC stator using an inverse direct-quadrature-zero transformation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
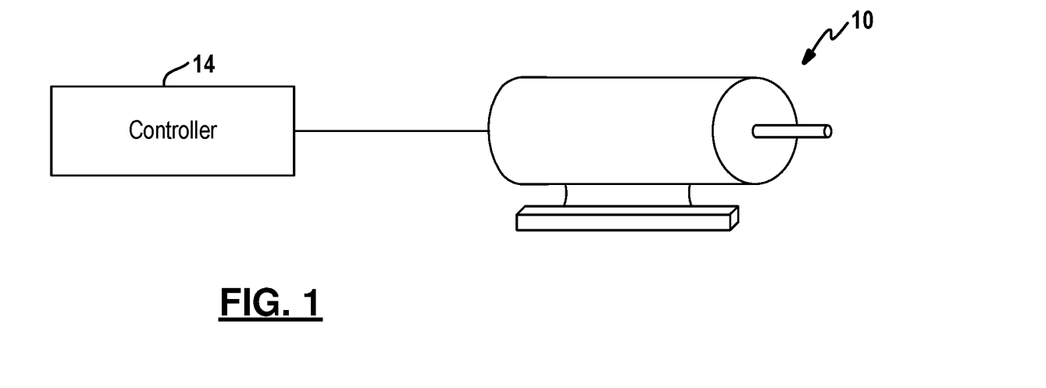
FIG. 1 is a diagram of an electric machine interfaced with a controller.

FIG. 1 depicts an electric machine 10 electrically coupled to a controller 14. The electric machine 10 is comprised of a rotor and a stator. The stator is arranged adjacent to and interoperates with the rotor. In one embodiment, the stator is coaxially arranged with the rotor although other arrangements, including side-by-side, fall within the scope of this disclosure. An electric machine is a generic term for machines that utilize electromagnetic forces, including but not limited to electric motors and generators.

More specifically, the stator is designed with four or more phases which can produce independent magnetic fields at two or more spatial harmonics. The rotor includes an excitation winding and a field winding. The field winding is electrically coupled to the excitation winding, for example via a rectifier circuit. Other means for transferring the electric power from the excitation winding to the field winding are also contemplated by this disclosure. Different example embodiments for the stator and rotor will be further described below.

In this electric machine 10, the rotor windings are wound so that they couple with the different spatial harmonics produced by the stator windings. Using field-oriented control techniques, a magnetic field is generated by the stator windings at a given spatial harmonic associated with the excitation winding that is rotating with respect to the excitation winding. This induces an AC voltage in the excitation winding of the rotor which is rectified into a DC voltage, and hence current, in the field winding of the rotor. The magnitude of the DC field current is therefore controlled by the magnitude of the rotating field. The AC stator will also produce a magnetic field component at the spatial harmonic associated with the field winding. This component will interact with the field-winding current, thereby producing torque. In other words, the excitation winding of the rotor is independently excitable from the field winding of the rotor by different spatial harmonics of the AC drive signal. With this approach, the power density of the synchronous field winding machine is significantly increased as compared to conventional field-winding designs.

The controller 14 regulates the current supplied to the windings of the stator in accordance with a control algorithm further described below. In an exemplary embodiment, the controller 14 is implemented as a microcontroller. It should be understood that the logic for the control algorithm can be implemented in hardware logic, software logic, or a combination of hardware and software logic. In this regard, controller 14 can be or can include any of a digital signal processor (DSP), microprocessor, microcontroller, or other programmable device which are programmed with software implementing the above described methods. It should be understood that alternatively the controller is or includes other logic devices, such as a Field Programmable Gate Array (FPGA), a complex programmable logic device (CPLD), or application specific integrated circuit (ASIC).

Figure 2A:
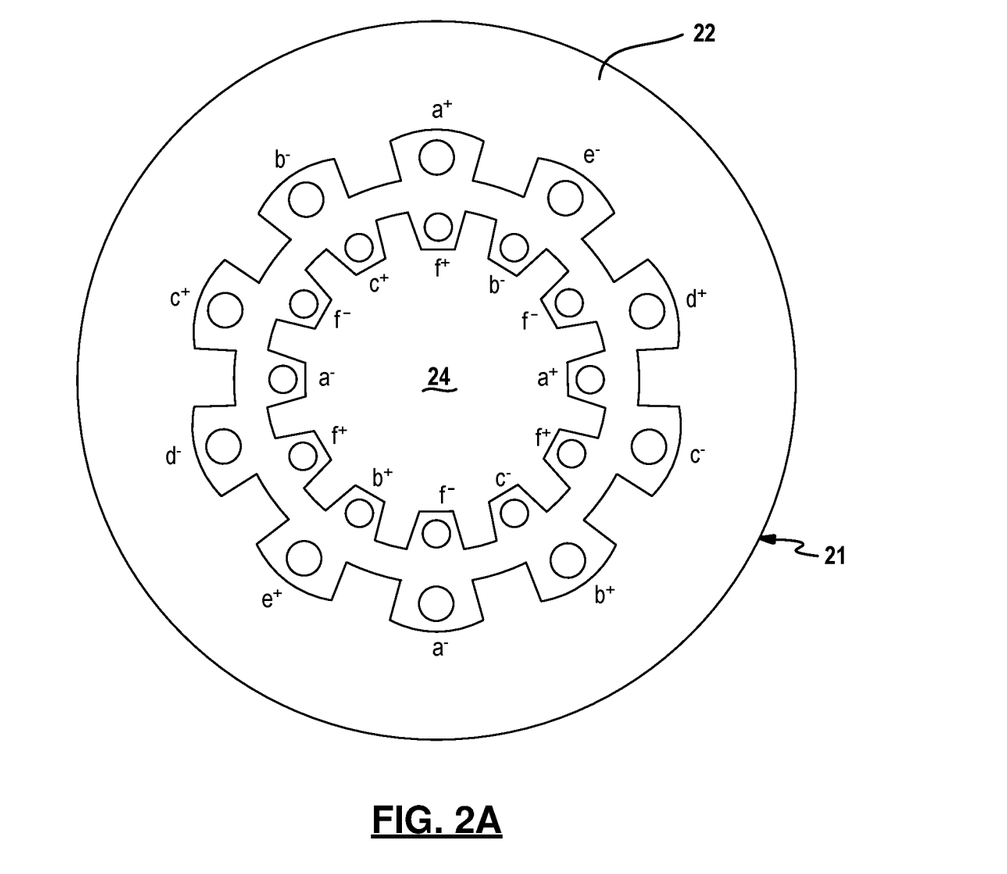
FIG. 2A is a cross-sectional view of an example embodiment of a stator coaxially arranged with a rotor.

FIG. 2A illustrates an example embodiment of a stator 21 coaxially arranged with a rotor 24. In this example, the stator has a 5-phase, 2-pole, single-layer distributed arrangement. More specifically, the stator 21 is configured with five phases: an a-phase winding, a b-phase winding, a c-phase winding, a d-phase winding and an e-phase winding installed on a stator core 22. Each winding is wound in two opposing slots formed in an inner circumferential surface of the stator core 22. For higher pole designs, other winding arrangements are contemplated by this disclosure. While a distributed arrangement is shown for the stator, a concentrated arrangement for the stator is suitable in other embodiments.

Figure 2B:
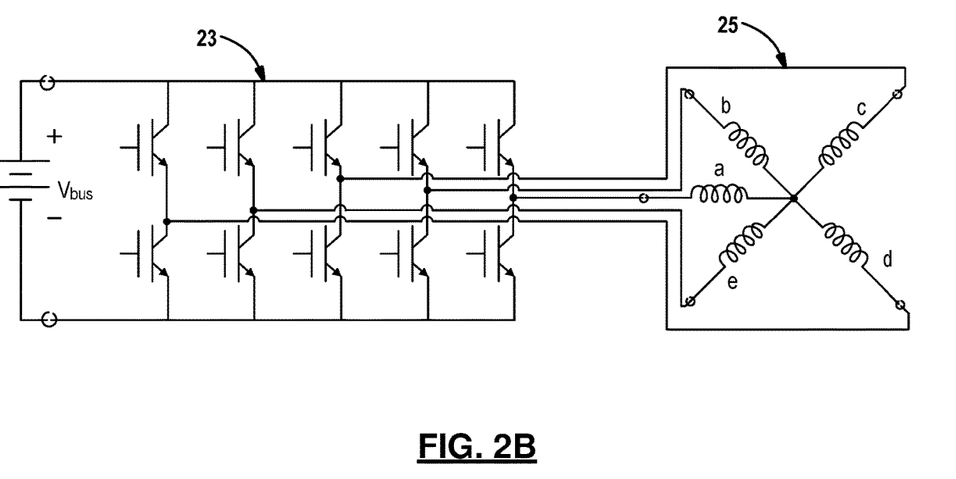
FIG. 2B is a schematic of an example stator circuit for use with the electric machine shown in FIG. 2A.

Referring to FIG. 2B, the stator windings 25 are connected to each other, for example in a star configuration although other configurations are also contemplated by this disclosure. Voltage is applied to the stator windings 25 by an inverter circuit 23. In particular, the inverter circuit 23 is a five phase inverter circuit which employs five pairs of transistors, where each transistor pair is coupled between a voltage source. Control signals are applied to the gate terminals of the transistors by the controller 14 in accordance with a control algorithm, thereby generating the voltages applied to each winding of the stator 21. The inverter circuit 23 is intended to be illustrative and not limiting.

Figure 2C:
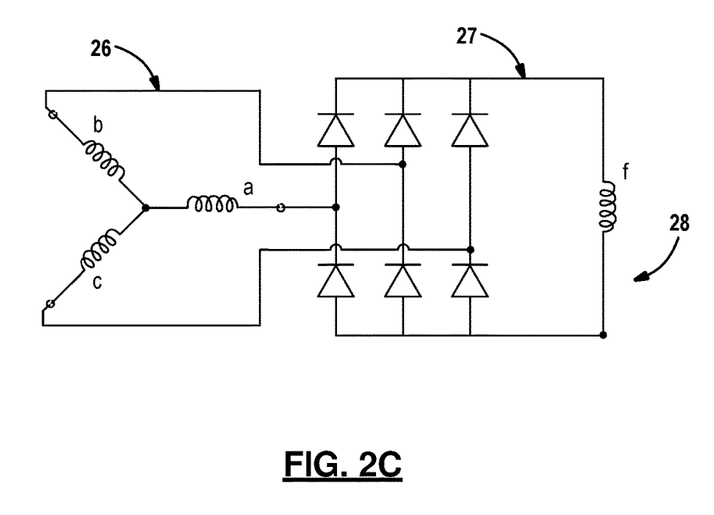
FIG. 2C is a schematic of an example rotor circuit for use with the electric machine shown in FIG. 2A.

With continued reference to FIGS. 2A and 2C, the rotor 24 includes an excitation winding 26 and a field winding 28. The excitation winding 26 is a 3-phase, 2-pole, single-layer distributed transformer windings, where the three-phases include an a-phase winding, a b-phase winding and a c-phase winding. Each winding is wound in two opposing slots formed on an outer circumferential surface of the rotor 24. The field winding 28 is a 1-phase, 6-pole, concentrated or distributed field winding. The field winding 28 is wound in slots interposed between each of the slots for the excitation windings. That is, the excitation winding has a 2-pole winding scheme and the field winding has a 6-pole winding scheme. Other possibilities include but are not limited to a 4-pole excitation winding and a 12-pole field winding; a 6-pole excitation winding and an 18-pole field winding, etc.

A schematic for an example rotor circuit is shown in FIG. 2C. In this example, the field winding 28 is electrically coupled by a rectifier circuit 27 to the excitation windings 26. In particular, the rectifier circuit 27 is a three-phase diode rectifier. That is, the rectifier circuit 27 is further defined by three pairs of diodes. For each phase, a first diode is electrically coupled between a given phase and the positive terminal of the field winding and a second diode is electrically coupled between the given phase and the negative terminal of the field winding. Other arrangements for a rectifier circuit or alternative coupling circuits also fall within the scope of this disclosure.

Figure 3A:
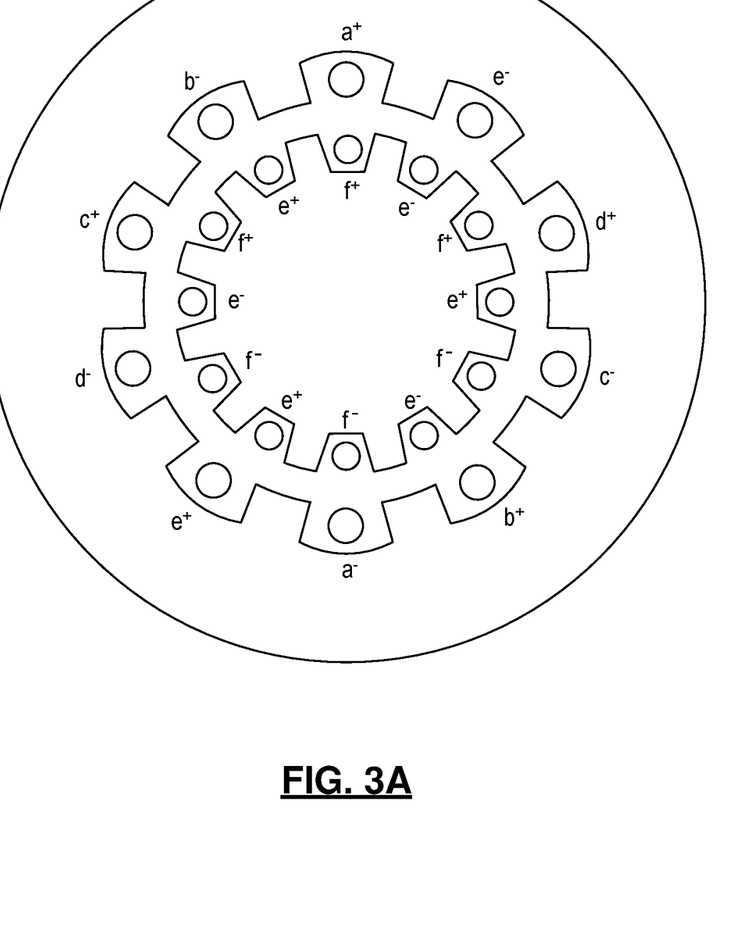
FIG. 3A is an example of an alternative embodiment for the stator and rotor arrangement.
Figure 3B:
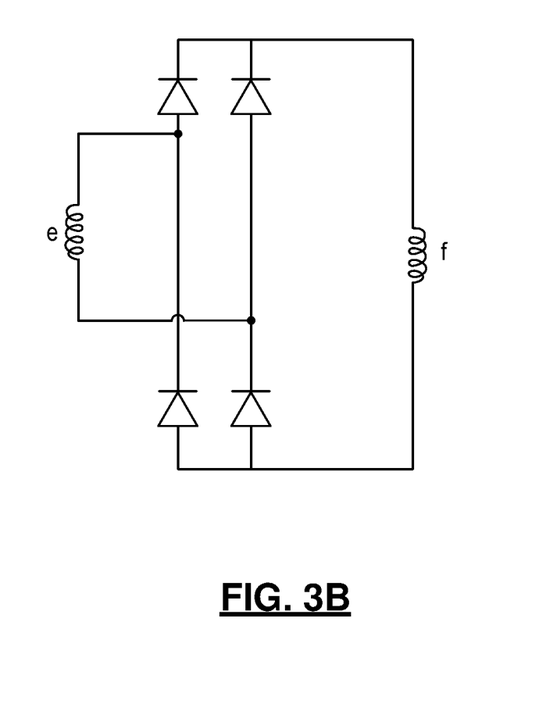
FIG. 3B is a schematic of an example rotor circuit for use with the electric machine shown in FIG. 3A.

FIG. 3 illustrates another example embodiment for the stator 21 and the rotor 24. In this example, the stator employs a 5-phase, 2-pole design; whereas, the excitation winding of the rotor has a single-phase, six-pole design and the field winding has a single-phase, two-pole design. In some embodiments, the rotor 24 may include permanent magnets in addition to the excitation winding and the field winding. Other arrangements for the stator 21 and rotor 24 also fall within the broader aspects of this disclosure.

With continued reference to the embodiment shown in FIG. 2, the torque output of the electric machine 10 is given by:

$$\tau_{em} = \frac{5N_p}{4} M_{af} i_f i_{q3}, \tag{1}$$

where $N_p$ is the number of poles, $M_{af}$ is the mutual inductance between the field winding and armature windings of the stator, and if is the field current. As explained below, and $i_{d1}$ can be used to induce voltages in the excitation winding, which are then rectified to generate the field current, $i_{d3}$ is used to produce torque with the resulting field current, and $i_{d3}$ can be used to achieve field weakening at high speeds (collectively referred to as d-q currents). Note that, in steady-state, these currents will be constant, which simplifies regulation.

Figure 4:
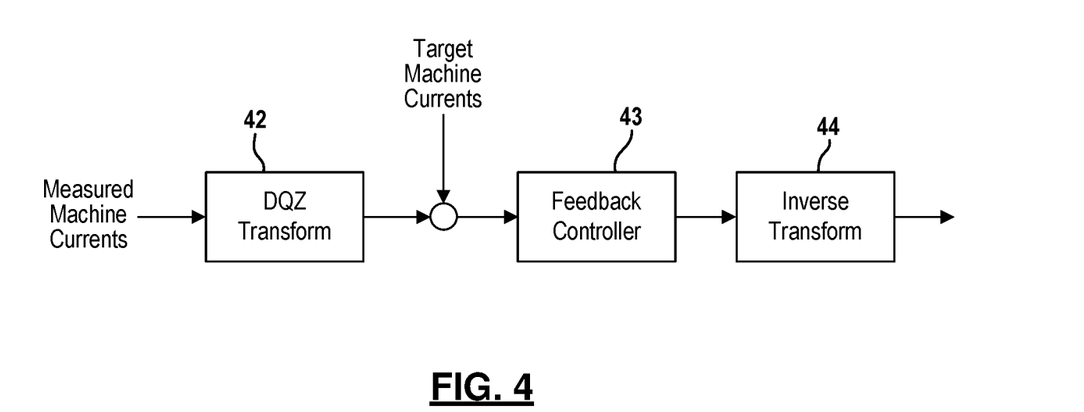
FIG. 4 is a diagram of a feedback control technique used to control the electric machine.

To regulate the d-q currents and achieve a desired torque, a feedback control technique may be used as seen in FIG. 4. Current in the stator windings is measured and serves as an input to the control algorithm. These current measurements are converted to d-q currents, for example using a direct-quadrature-zero transformation 42. The converted d-q currents are subtracted from the reference currents to produce an error signal which serves as an input to a feedback controller 43. D-q voltages are output by the feedback controller 43. The d-q voltages can then be converted to command voltages for the inverter circuit, for example using an inverse direct-quadrature-zero transformation 44. In this way, the command voltages are the voltages applied to each stator winding to achieve the target or desired d-q currents.

Figure 5:
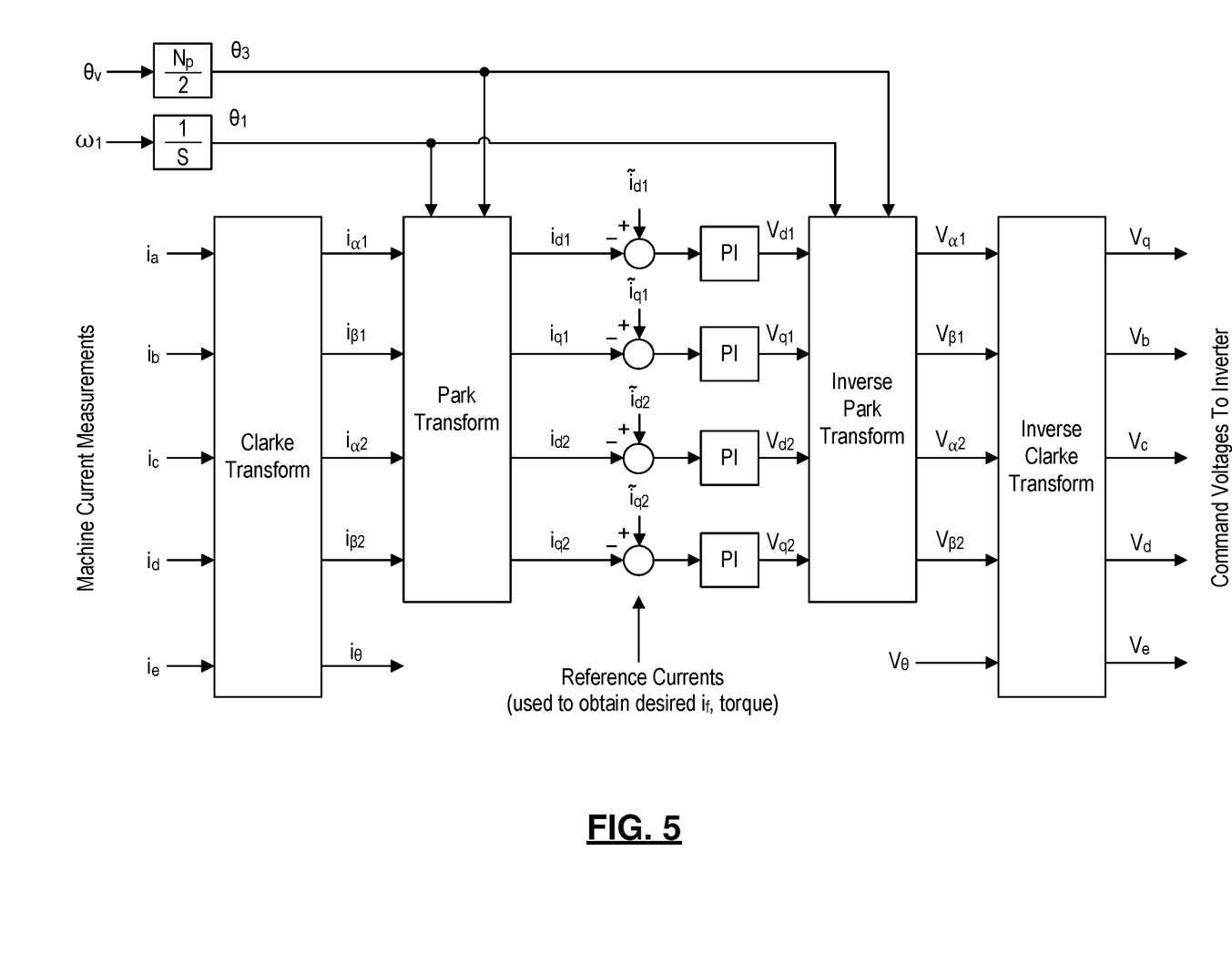
FIG. 5 is a diagram depicting an example of a control algorithm implemented by the controller.

FIG. 5 illustrates the control algorithm in more detail. Again, the control algorithm applied to the five-phase electric machine shown in FIG. 2. The fundamental spatial harmonic produced by the stator is used to excite the excitation winding of the rotor and the third spatial harmonic produced by the stator interacts with the field current to produce torque. It is noted that the $i_{d1}$ and $i_{q1}$ currents also produce a small torque through their interaction with the excitation windings.

During operation, the current in the stator windings can be measured using a sense resistor or other known current sensing methods. In one example, this measured current is transformed into two sets of α-β currents, one set for each spatial harmonic, and a "zero sequence" current corresponding to the average of the phase currents. A Clarke transform may be used as follows:

$$\begin{bmatrix} i_{\alpha 1} \\ i_{\beta 1} \\ i_{\alpha 3} \\ i_{\beta 3} \\ i_0 \end{bmatrix} =$$

$$\frac{2}{5} \begin{bmatrix} \cos\left(\frac{2\pi*0}{5}\right) & \cos\left(\frac{2\pi*1}{5}\right) & \cos\left(\frac{2\pi*2}{5}\right) & \cos\left(\frac{2\pi*3}{5}\right) & \cos\left(\frac{2\pi*4}{5}\right) \\ \sin\left(\frac{2\pi*0}{5}\right) & \sin\left(\frac{2\pi*1}{5}\right) & \sin\left(\frac{2\pi*2}{5}\right) & \sin\left(\frac{2\pi*3}{5}\right) & \sin\left(\frac{2\pi*4}{5}\right) \\ \cos\left(\frac{2\pi*0}{5}\right) & \cos\left(\frac{2\pi*3}{5}\right) & \cos\left(\frac{2\pi*6}{5}\right) & \cos\left(\frac{2\pi*9}{5}\right) & \cos\left(\frac{2\pi*12}{5}\right) \\ \sin\left(\frac{2\pi*0}{5}\right) & \sin\left(\frac{2\pi*3}{5}\right) & \sin\left(\frac{2\pi*6}{5}\right) & \sin\left(\frac{2\pi*9}{5}\right) & \sin\left(\frac{2\pi*12}{5}\right) \\ \frac{1}{2} & \frac{1}{2} & \frac{1}{2} & \frac{1}{2} & \frac{1}{2} \end{bmatrix} \begin{bmatrix} i_a \\ i_b \\ i_c \\ i_d \\ i_e \end{bmatrix}$$

The zero sequence current $i_q$ is preferably constrained to be zero due to the winding configuration.

The two sets of α-β currents are in turn transformed using a Park transformation into different synchronous reference frames with different electrical frequencies as follows:

$$\begin{bmatrix} i_{d1} \\ i_{q1} \end{bmatrix} = \begin{bmatrix} \cos(\theta_{s1}) & \sin(\theta_{s1}) \\ -\sin(\theta_{s1}) & \cos(\theta_{s1}) \end{bmatrix} \begin{bmatrix} i_{\alpha 1} \\ i_{\beta 1} \end{bmatrix},$$

$$\begin{bmatrix} i_{d3} \\ i_{q3} \end{bmatrix} = \begin{bmatrix} \cos(\theta_{s3}) & \sin(\theta_{s3}) \\ -\sin(\theta_{s3}) & \cos(\theta_{s3}) \end{bmatrix} \begin{bmatrix} i_{\alpha 3} \\ i_{\beta 3} \end{bmatrix}$$

$$\frac{d\theta_{s1}}{dt} = \omega_{s1},$$

$$\frac{d\theta_{s3}}{dt} = \omega_{s3}$$

In this example, $\Theta_{s3}$ is the electrical rotor angle or the number of pole-pairs times the measured rotor angle and its derivative $\omega_{s3}$ is the electrical rotor speed. The frequency $\omega_{s1}$ is responsible for exciting the excitation winding, and can be chosen to keep the overall voltages and currents within the inverter limits. $\Theta_{s3}$ is calculated from the measured rotor position. In one embodiment, $\omega_{s1}$ is chosen to stay within voltage and current limits and $\Theta_{s1}$ is determined by integrating $\omega_{s1}$. The converted d-q currents are subtracted from the reference d-q currents to produce an error signal. The error signal is an input to a proportional-integral controller which outputs d-q voltages. The two sets of d-q voltages are converted into their α-β values using an inverse Park transformation as follows:

$$\begin{bmatrix} v_{\alpha 1} \\ v_{\beta 1} \end{bmatrix} = \begin{bmatrix} \cos(\theta_{s1}) & -\sin(\theta_{s1}) \\ \sin(\theta_{s1}) & \cos(\theta_{s1}) \end{bmatrix} \begin{bmatrix} v_{d1} \\ v_{q1} \end{bmatrix},$$

$$\begin{bmatrix} v_{\alpha 3} \\ v_{\beta 3} \end{bmatrix} = \begin{bmatrix} \cos(\theta_{s3}) & -\sin(\theta_{s3}) \\ \sin(\theta_{s3}) & \cos(\theta_{s3}) \end{bmatrix} \begin{bmatrix} v_{d3} \\ v_{q3} \end{bmatrix}$$

The two-sets of α-β voltages are then used to determine duty cycles which generate the corresponding 5-phase voltages in an average-value sense. These 5-phase voltages are given by an inverse Clarke transform as follows:

$$\begin{bmatrix} v_a \\ v_b \\ v_c \\ v_d \\ v_e \end{bmatrix} = \begin{bmatrix} 1 & 0 & 1 & 0 & 1 \\ \cos\left(\frac{2\pi*1}{5}\right) & \cos\left(\frac{2\pi*1}{5}\right) & \cos\left(\frac{2\pi*3}{5}\right) & \cos\left(\frac{2\pi*3}{5}\right) & 1 \\ \sin\left(\frac{2\pi*2}{5}\right) & \sin\left(\frac{2\pi*2}{5}\right) & \sin\left(\frac{2\pi*6}{5}\right) & \sin\left(\frac{2\pi*6}{5}\right) & 1 \\ \cos\left(\frac{2\pi*3}{5}\right) & \cos\left(\frac{2\pi*3}{5}\right) & \cos\left(\frac{2\pi*9}{5}\right) & \cos\left(\frac{2\pi*9}{5}\right) & 1 \\ \sin\left(\frac{2\pi*3}{5}\right) & \sin\left(\frac{2\pi*4}{5}\right) & \sin\left(\frac{2\pi*12}{5}\right) & \sin\left(\frac{2\pi*12}{5}\right) & 1 \end{bmatrix} \begin{bmatrix} v_{\alpha 1} \\ v_{\beta 1} \\ v_{\alpha 3} \\ v_{\beta 3} \\ v_0 \end{bmatrix},$$

where $v_0$ is the zero-sequence voltage, which can be used as a degree of freedom to help stay within the voltage constraints of the inverter. To achieve the reference or desired d-q currents, the 5-phase voltages are applied to the corresponding stator windings. The controller 14 interfaces with the inverter circuit 23 to generate the voltages applied to the stator windings.

The control algorithm described above is merely illustrative and not intended to be limiting of control algorithms which may be used with the proposed electric machines. By swapping the fundamental and third harmonics, the control algorithm can be adapted for use with the electric machine shown in FIG. 3. One skilled in the art could understand how to extend these control principles to other stator and rotor arrangements.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric machine, comprising:
   a rotor;
   an AC stator configured to receive an AC drive signal and arranged adjacent to and interoperable with the rotor, wherein the AC stator is configured with four or more phases to independently produce magnetic fields at two or more spatial harmonics;
   wherein the rotor includes an excitation winding and a field winding and the field winding is electrically coupled to the excitation winding, wherein the excitation winding and the field winding are configured to magnetically couple to the two or more spatial harmonics of the AC drive signal, such that the excitation winding is independently excitable from the field winding by different spatial harmonics of the AC drive signal; and
   a controller electrically coupled to windings of the AC stator and independently controls the magnetic fields at the two or more spatial harmonics.

2. The electric machine of claim 1 wherein torque of the electric machine is determined as a function of current in the field winding and current in the AC stator that produces a spatial harmonic which magnetically couples to the field winding.

3. The electric machine of claim 1 wherein the excitation winding is configured to magnetically couple to a given harmonic of the magnetic fields produced by the AC stator and the field winding is configured to magnetically couple to another harmonic which is three times the given harmonic.

4. The electric machine of claim 1 wherein the AC stator includes windings arranged to generate an AC drive signal.

5. The electric machine of claim 1 wherein the AC stator is configured with five windings and the excitation winding is further defined as a three phase winding.

6. The electric machine of claim 1 wherein the field winding is electrically coupled by a rectifier circuit to the excitation winding.

7. The electric machine of claim 1 wherein the controller is electrically coupled via an inverter circuit to windings of the AC stator.

8. The electric machine of claim 1 wherein the controller is configured to receive measurements of current in the windings of the stator and convert the measurements to d-q currents using a direct-quadrature-zero transformation.

9. The electric machine of claim 8 where the controller calculate differences between the d-q currents and a set of reference currents, converts the differences to voltages and generate command voltages for the AC stator using an inverse direct-quadrature-zero transformation.

10. An electric machine, comprising:
    a rotor;
    an AC stator configured to receive an AC drive signal and arranged adjacent to and interoperable with the rotor, wherein the AC stator having windings arranged to independently produce magnetic fields at two or more spatial harmonics;
    wherein the rotor includes an excitation winding and a field winding and the field winding is electrically coupled by a rectifier circuit to the excitation winding, such that the excitation winding is configured to magnetically couple to a given spatial harmonic of the two or more spatial harmonics of the AC drive signal and the field winding is configured to magnetically couple to another harmonic of the two or more spatial harmonics of the AC drive signal, where the given spatial harmonic differs from the another harmonic; and
    a controller electrically coupled via an inverter circuit to windings of the AC stator and independently controls the magnetic fields at the two or more spatial harmonics.

11. The electric machine of claim 10 wherein torque of the electric machine is determined as a function of current in the field winding and current in the AC stator that produces the spatial harmonic which magnetically couples to the field winding.

12. The electric machine of claim 10 wherein the excitation winding is configured to magnetically couple to a given harmonic of the magnetic fields produced by the AC stator and the field winding is configured to magnetically couple to another harmonic which is three times the given harmonic.

13. The electric machine of claim 10 wherein the excitation winding has a 2-pole winding arrangement and the field winding has a 6-pole winding arrangement.

14. The electric machine of claim 10 wherein the excitation winding has a 4-pole winding arrangement and the field winding has a 12-pole winding arrangement.

15. The electric machine of claim 10 wherein the AC stator has 4-pole winding arrangement.

16. The electric machine of claim 10 wherein the controller is configured to receive measurements of current in the windings of the AC stator and convert the current measurements to d-q currents using a direct-quadrature-zero transformation.

17. The electric machine of claim 16 where the controller calculate differences between the d-q currents and a set of reference currents, converts the differences to voltages and generate command voltages for the AC stator using an inverse direct-quadrature-zero transformation.

* * * * *